United States Patent
Wang et al.

(10) Patent No.: US 12,554,669 B2
(45) Date of Patent: Feb. 17, 2026

(54) PCIE INTERRUPT PROCESSING METHOD AND APPARATUS, DEVICE AND NON-TRANSITORY READABLE STORAGE MEDIUM

(71) Applicant: IEIT SYSTEMS CO., LTD., Shandong (CN)

(72) Inventors: Yuanli Wang, Shandong (CN); Hongwei Kan, Shandong (CN); Jiangwei Wang, Shandong (CN); Le Yang, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 18/724,870

(22) PCT Filed: Mar. 6, 2023

(86) PCT No.: PCT/CN2023/079886
§ 371 (c)(1),
(2) Date: Jun. 27, 2024

(87) PCT Pub. No.: WO2024/051122
PCT Pub. Date: Mar. 14, 2024

(65) Prior Publication Data
US 2025/0068580 A1 Feb. 27, 2025

(30) Foreign Application Priority Data
Sep. 5, 2022 (CN) .......................... 202211075829.9

(51) Int. Cl.
*G06F 13/42* (2006.01)
*G06F 13/24* (2006.01)

(52) U.S. Cl.
CPC .......... *G06F 13/4221* (2013.01); *G06F 13/24* (2013.01); *G06F 2213/0026* (2013.01); *G06F 2213/24* (2013.01)

(58) Field of Classification Search
None
See application file for complete search history.

(56) References Cited

U.S. PATENT DOCUMENTS 8,321,615 B2 * 11/2012 Foong ................... G06F 9/4812
710/200
8,656,079 B2 * 2/2014 Kegel ..................... G06F 13/24
710/266

(Continued)

FOREIGN PATENT DOCUMENTS

| CN | 103959267 A | 7/2014 |
| CN | 106681816 A | 5/2017 |

(Continued)

OTHER PUBLICATIONS

Translation of PCT International Search Report mailed on May 10, 2023 for PCT /CN2023/079886 (3 pages).

*Primary Examiner* — Elias Mamo
(74) *Attorney, Agent, or Firm* — Merchant & Gould P.C.

(57) ABSTRACT

Provided are a PCIe interrupt processing method and apparatus, a device and a non-transitory readable storage medium, relating to the technical field of computers. The PCIe interrupt processing method comprises: a currently generated internal interrupt signal is acquired; a PCIe interrupt type supported by a current FPGA is determined according to an interrupt vector signal output by a PCIe IP core, so as to determine a corresponding target interrupt processing mechanism according to the PCIe interrupt type; and the internal interrupt signal is processed by means of the target interrupt processing mechanism, and a processing result is input to the PCIe IP core, such that the PCIe IP core (Continued)

sends an interrupt message packet to a central processing unit on the basis of the processing result. The technical solution expands the compatibility of an FPGA with processor interrupts, facilitating the implementation of FPGA logic platform construction.

19 Claims, 7 Drawing Sheets

(56) References Cited

U.S. PATENT DOCUMENTS

| | | | | |
|---|---|---|---|---|
| 9,727,494 | B1* | 8/2017 | Gandhi | G06F 13/126 |
| 10,585,826 | B2* | 3/2020 | Jayasena | G06F 13/24 |
| 10,853,284 | B1 | 12/2020 | Warkentin et al. | |
| 11,650,835 | B1* | 5/2023 | Wasserstrom | G06F 13/105 |
| | | | | 703/28 |
| 11,941,458 | B2* | 3/2024 | Niell | G06F 13/4022 |
| 2002/0083258 | A1* | 6/2002 | Bauman | G06F 13/24 |
| | | | | 710/260 |
| 2010/0262741 | A1 | 10/2010 | Hayakawa et al. | |
| 2013/0080673 | A1 | 3/2013 | Feehrer et al. | |
| 2014/0019738 | A1* | 1/2014 | Kataoka | G06F 9/3851 |
| | | | | 712/240 |
| 2022/0229795 | A1* | 7/2022 | Cline | G06F 9/30076 |

FOREIGN PATENT DOCUMENTS

| | | |
|---|---|---|
| CN | 111078597 A | 4/2020 |
| CN | 114265800 A | 4/2022 |
| CN | 114817106 A | 7/2022 |
| CN | 115221083 A | 10/2022 |
| JP | 2006209386 A | 8/2006 |
| JP | 2009169928 A | 7/2009 |

* cited by examiner

0
PCIE INTERRUPT PROCESSING METHOD AND APPARATUS, DEVICE AND NON-TRANSITORY READABLE STORAGE MEDIUM

CROSS-REFERENCE TO RELATED APPLICATION

This application is a National Stage Application of International Application No. PCT/CN2023/079886 filed on Mar. 6, 2023, which claims the benefit of Serial No. 202211075829.9 filed on Sep. 5, 2022 in China, and which applications are incorporated herein by reference. To the extent appropriate, a claim of priority is made to each of the above disclosed applications.

TECHNICAL FIELD

The present disclosure relates to the technical field of computers, and in particular, to a PCIe interrupt processing method and apparatus, a device and a non-transitory readable storage medium.

BACKGROUND

With the vigorous development of cloud computing technologies, more and more services are processed by the cloud; therefore, a large amount of data needs to be efficiently processed and analyzed in real time, and a huge amount of server resources are occupied for data analysis and processing, etc. Meanwhile, with the failure of Moore's Law, the increase in the computing capability of a Central Processing Unit (CPU) cannot meet the demands of these services. Heterogeneous acceleration systems have become the main direction of choice, allowing relevant data computing to be offloaded to heterogeneous acceleration platforms for processing. In these years, with Field Programmable Gate Array (FPGA) devices serving as a programmable chip having high performance and low power consumption, when massive data is processed, the FPGA has higher computing efficiency and more prominent advantages, and especially when a large number of servers are deployed, the hidden operation cost is significantly reduced. Therefore, an FPGA-based heterogeneous platform provides a new implementation approach for applications of a heterogeneous acceleration platform.

At present, an FPGA-based cloud platform is applied to a data center more and more widely, and with the upgrade of an FPGA device model, the supported Peripheral Component Interconnect express (PCIe) interrupt type has changed from one of a traditional INTx interrupt (a traditional external interrupt trigger mechanism), a Message Signal Interrupt (MSI), or a Message Signaled Interrupt extended (MSIX) to support the foregoing multiple interrupt types. However, in early development, in order to quickly cooperate with driver software for simple development, the FPGA logic design only completes the design of matching with one type of interrupt, and does not support the other two interrupt modes. That is, the logic design for the PCIe interrupt type of the FPGA is performed by selecting one of the interrupt types from the INTx interrupt, the MSI interrupt or the MSIX interrupt according to software drive requirements. In this way, during the subsequent upgrade and development of the drive platform, if the supported interrupt type changes, it is necessary to modify the FPGA logic again to cooperate with the upgrade of the software. If so, it is not only necessary to re-select an interrupt logic interface, and re-write logic design codes because they are not compatible, but also it is necessary for the FPGA cloud platform to perform firmware upgrade, which increases the period and maintainability of the whole project, and does not facilitate the construction of FPGA logic platform.

In conclusion, how to expand the compatibility of an FPGA with processor interrupts and maintain the construction of FPGA logic platform is a problem to be solved at present.

SUMMARY

In view of this, the purpose of the present disclosure is to provide a PCIe interrupt processing method and apparatus, a device and a non-transitory readable storage medium, which can expand the compatibility of an FPGA with processor interrupts, and maintain the construction of FPGA logic platform. The solution is as follows:

According to a first aspect, the present disclosure discloses a PCIe interrupt processing method, including:
 a currently generated internal interrupt signal is acquired;
 a PCIe interrupt type supported by a current FPGA is determined according to an interrupt vector signal output by a PCIe IP core, so as to determine a corresponding target interrupt processing mechanism according to the PCIe interrupt type; and
 the internal interrupt signal is processed by means of the target interrupt processing mechanism, and a processing result is input to the PCIe IP core, such that the PCIe IP core sends an interrupt message packet to a central processing unit on the basis of the processing result.

In an embodiment, the step that a currently generated internal interrupt signal is acquired includes:
 an internal interrupt signal currently generated in a kernel is acquired.

In an embodiment, the step that a PCIe interrupt type supported by a current FPGA is determined according to an interrupt vector signal output by a PCIe IP core includes:
 an interrupt type identifier in the interrupt vector signal output by the PCIe IP core is read, and a PCIe interrupt type supported by the current FPGA is determined according to the interrupt type identifier.

In an embodiment, the step that an interrupt type identifier in the interrupt vector signal output by the PCIe IP core is read includes:
 an identifier of a PCIe interrupt type supported by the current FPGA in the interrupt vector signal irq vector [97:0] output by the PCIe IP core of the FPGA is read as the interrupt type identifier of the PCIe interrupt type supported by the current FPGA.

In an embodiment, the step that a PCIe interrupt type supported by the current FPGA is determined according to the interrupt type identifier includes:
 in the case that the interrupt type identifier is 2'b00, it is determined that the PCIe interrupt type supported by the current FPGA is INTx interrupt type;
 in the case that the interrupt type identifier is 2'b01, it is determined that the PCIe interrupt type supported by the current FPGA is MSI interrupt type; and
 in the case that the interrupt type identifier is 2'b10, it is determined that the PCIe interrupt type supported by the current FPGA is MSIX interrupt type.

In an embodiment, the step that a corresponding target interrupt processing mechanism is determined according to the PCIe interrupt type includes:

if the PCIe interrupt type is INTx type, it is determined that the target interrupt processing mechanism is an INTx interrupt processing mechanism;

if the PCIe interrupt type is MSI type, it is determined that the target interrupt processing mechanism is an MSI interrupt processing mechanism; and if the PCIe interrupt type is MSIX type, it is determined that the target interrupt processing mechanism is an MSIX interrupt processing mechanism.

In an embodiment, the step that the internal interrupt signal is processed by means of the target interrupt processing mechanism, and a processing result is input to the PCIe IP core, such that the PCIe IP core sends an interrupt message packet to a central processing unit on the basis of the processing result includes:

if the PCIe interrupt type is INTx type, the internal interrupt signal is processed by means of an INTx interrupt processing mechanism to obtain a processed interrupt signal;

the processed interrupt signal is sent to the PCIe IP core by means of an INTx interrupt interface, and the processed interrupt signal is released after acquisition of an acknowledgement signal fed back by the PCIe IP core; and an interrupt message packet is sent to a central processing unit after acquisition of the processed interrupt signal by means of the PCIe IP core.

In an embodiment, the step that the internal interrupt signal is processed by means of the target interrupt processing mechanism, and a processing result is input to the PCIe IP core, such that the PCIe IP core sends an interrupt message packet to a central processing unit on the basis of the processing result includes:

if the PCIe interrupt type is MSI type, timing processing is performed on an MSI interrupt interface by means of an MSI interrupt processing mechanism on the basis of the internal interrupt signal to output a preset message address and an interrupt vector number corresponding to the internal interrupt signal to the PCIe IP core; and an interrupt message packet is sent to a central processing unit by means of the PCIe IP core on the basis of the preset message address and the interrupt vector number corresponding to the internal interrupt signal.

In an embodiment, the PCIe interrupt processing method further includes:

the preset message address pre-written in a capability register of the PCIe IP core is determined, and the interrupt vector signal is set on the basis of the preset message address; and the preset message address is acquired from the interrupt vector signal.

In an embodiment, the step that the preset message address is acquired from the interrupt vector signal includes:

a destination address of an MSI memory write transaction is acquired from the interrupt vector signal irq_ vector as the preset message address.

In an embodiment, the step that the internal interrupt signal is processed by means of the target interrupt processing mechanism, and a processing result is input to the PCIe IP core, such that the PCIe IP core sends an interrupt message packet to a central processing unit on the basis of the processing result includes:

if the PCIe interrupt type is MSIX type, timing processing is performed on an MSIX interrupt interface by means of an MSIX interrupt processing mechanism on the basis of the internal interrupt signal to output address information and interrupt number information that are read from a target storage table; and an interrupt message packet is sent to a central processing unit by means of the PCIe IP core on the basis of the address information and the interrupt number information.

In an embodiment, before the step that timing processing is performed on an MSIX interrupt interface by means of an MSIX interrupt processing mechanism on the basis of the internal interrupt signal to output address information and interrupt number information that are read from a target storage table, the method further includes:

each interrupt request is stored in an MSIX interrupt table module by using an independent message address field and message data field, so as to obtain the target storage table, wherein the message address field represents the address information, and the message data field represents the interrupt number information.

In an embodiment, the PCIe interrupt processing method further includes:

a corresponding target storage table is searched for on the basis of the interrupt vector number corresponding to the internal interrupt signal, and the address information and the interrupt number information are read from the target storage table.

In an embodiment, the step that a corresponding target storage table is searched for on the basis of the interrupt vector number corresponding to the internal interrupt signal, and the address information and the interrupt number information are read from the target storage table includes:

when the internal interrupt signal is received, the target storage table in the MSIX interrupt table module is searched for by taking the interrupt vector number corresponding to the internal interrupt signal as an address; and a message address field is read from the target storage table as the address information, and a message data field is read from the target storage table as the interrupt number information.

In an embodiment, after the step that a currently generated internal interrupt signal is acquired, the method further includes:

by means of an internal interrupt processing mechanism pre-defined in the current FPGA and on the basis of an acquired target setting instruction, mask setting is performed on the internal interrupt signal by means of a register configuration interface, so as to determine whether the internal interrupt signal is to be reported to a central processing unit; and upon determination that the internal interrupt signal is to be reported to the central processing unit, the step that the internal interrupt signal is processed by means of the target interrupt processing mechanism is jumped to.

In an embodiment, the PCIe interrupt processing method further includes:

the internal interrupt signal is numbered by means of the internal interrupt processing mechanism on the basis of a preset number, so as to obtain an interrupt vector number corresponding to each internal interrupt signal.

In an embodiment, during the internal interrupt signal is processed by means of the target interrupt processing mechanism, the method further includes:

when a plurality of internal interrupt signals are acquired, the internal interrupt signals are processed in sequence in an ascending order of the interrupt vector numbers.

According to a second aspect, the present disclosure discloses a PCIe interrupt processing apparatus, including:

an interrupt signal acquisition module, configured to acquire a currently generated internal interrupt signal;

an interrupt type determination module, configured to determine a PCIe interrupt type supported by a current FPGA according to an interrupt vector signal output by a PCIe IP core, so as to determine a corresponding target interrupt processing mechanism according to the PCIe interrupt type; and an interrupt message packet sending module, configured to process the internal interrupt signal by means of the target interrupt processing mechanism, and input a processing result to the PCIe IP core, such that the PCIe IP core sends an interrupt message packet to a central processing unit on the basis of the processing result.

According to a third aspect, the present disclosure discloses an electronic device, including:

a memory, configured to store a computer program; and a processor, configured to execute the computer program to implement the steps of the PCIe interrupt processing method disclosed above.

According to a fourth aspect, the present disclosure discloses a computer non-transitory readable storage medium, configured to store a computer program; wherein the computer program, when executed by a processor, implements the steps of the PCIe interrupt processing method disclosed above.

Hence, in the present disclosure, a currently generated internal interrupt signal is acquired; a PCIe interrupt type supported by a current FPGA is determined according to an interrupt vector signal output by a PCIe IP core, so as to determine a corresponding target interrupt processing mechanism according to the PCIe interrupt type; and the internal interrupt signal is processed by means of the target interrupt processing mechanism, and a processing result is input to the PCIe IP core, such that the PCIe IP core sends an interrupt message packet to a central processing unit on the basis of the processing result. It can be seen that an FPGA cloud platform in the present disclosure supports a plurality of PCIe interrupt types, and each PCIe interrupt type has its corresponding interrupt processing mechanism; it only needs to determine which PCIe interrupt type is supported by the current FPGA according to an interrupt vector signal output by a PCIe IP core, and then an internal interrupt signal is processed by means of a corresponding target interrupt processing mechanism; and finally, a processing result is input to the PCIe IP core, such that the PCIe IP core sends an interrupt message packet to a central processing unit on the basis of the processing result. By means of the described technical solution, when the model of an FPGA is upgraded, only an interrupt processing mechanism needs to be switched, without modifying a logic code for internal interrupt processing. In addition, each interrupt function in the present disclosure can be independently developed and maintained, thereby enhancing the stability of an FPGA platform, expanding the compatibility of an FPGA with processor interrupts, facilitating the implementation of FPGA logic platform construction, and also ensuring the platform construction of an underlying driver layer.

BRIEF DESCRIPTION OF THE DRAWINGS

To describe the technical solutions in the embodiments of the present disclosure or in the prior art more clearly, the following briefly introduces the drawings required for description in the embodiments or the prior art. Apparently, the drawings in the following description show merely some embodiments of the present disclosure, and a person of ordinary skill in the art may still derive other drawings from the provided drawings without inventive efforts.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely some rather than all of the embodiments of the present disclosure. All other embodiments obtained by a person of ordinary skill in the art based on the embodiments of the present disclosure without inventive efforts shall belong to the scope of protection of the present disclosure.

Currently, the logic design for the PCIe interrupt type of the FPGA is performed by selecting one of the interrupt types from the INTx interrupt, the MSI interrupt or the MSIX interrupt according to software drive requirements. In this way, during the subsequent upgrade and development of the drive platform, if the supported interrupt type changes, it is necessary to modify the FPGA logic again to cooperate with the upgrade of the software. If so, it is not only necessary to re-select an interrupt logic interface, and re-write logic design codes because they are not compatible, but also it is necessary for the FPGA cloud platform to perform firmware upgrade, which increases the period and maintainability of the whole project, and does not facilitate the construction of FPGA logic platform. In view of this, disclosed in the embodiments of the present disclosure are a PCIe interrupt processing method and apparatus, a device and a non-transitory readable storage medium, which can expand the compatibility of an FPGA with processor interrupts, and maintain the construction of FPGA logic platform.

Figure 1:
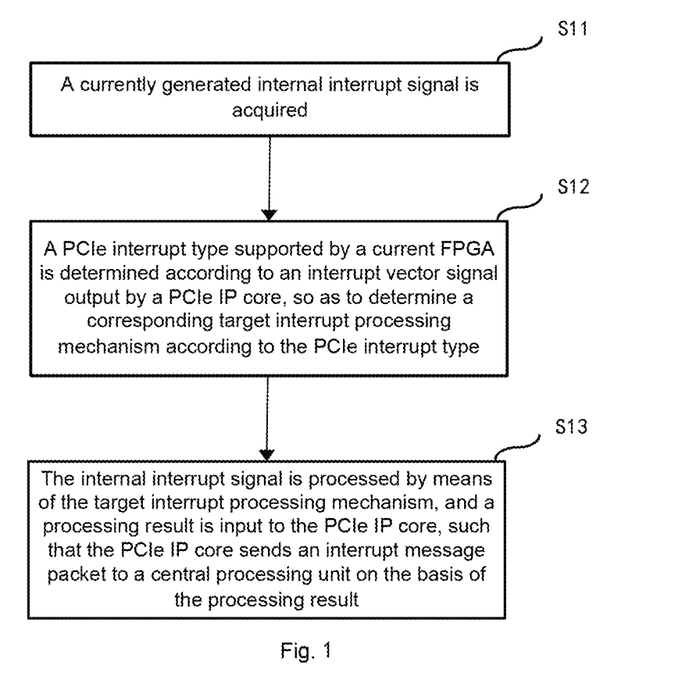
FIG. 1 is a flowchart of a PCIe interrupt processing method according to the present disclosure.

As shown in FIG. 1, disclosed in the embodiments of the present disclosure is a PCIe interrupt processing method. The method includes:

step S11: a currently generated internal interrupt signal is acquired.

In this embodiment, the step that a currently generated internal interrupt signal is acquired may refer to acquiring an internal interrupt signal currently generated in a kernel. That is, the internal interrupt may be an interrupt sent by a kernel, and in addition, may also be an interrupt sent by another internal functional module.

Step S12: a PCIe interrupt type supported by a current FPGA is determined according to an interrupt vector signal output by a PCIe IP core, so as to determine a corresponding target interrupt processing mechanism according to the PCIe interrupt type.

Figure 2:
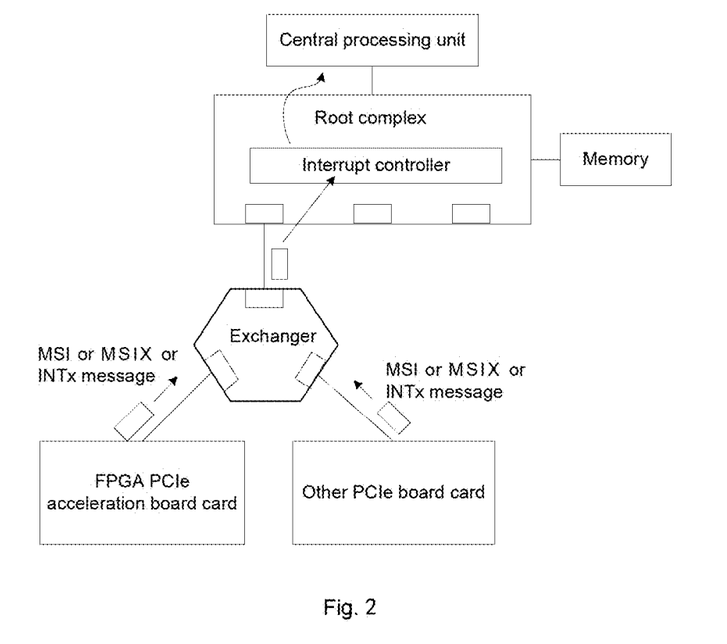
FIG. 2 is a schematic diagram of an existing PCIe interrupt processing mechanism according to the present disclosure.
Figure 3:
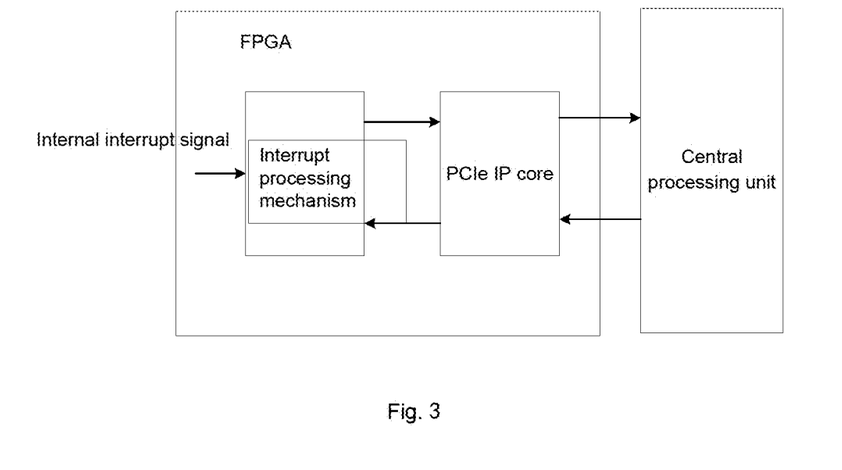
FIG. 3 is a schematic diagram of another existing PCIe interrupt processing mechanism according to the present disclosure.

In this embodiment, which PCIe interrupt type is supported or generated by the current FPGA can be determined according to the interrupt vector signal output by the PCIe IP core, so as to determine a corresponding target interrupt processing mechanism according to the PCIe interrupt type. The step that a corresponding target interrupt processing mechanism is determined according to the PCIe interrupt type includes: if the PCIe interrupt type is INTx type, it is determined that the target interrupt processing mechanism is an INTx interrupt processing mechanism; if the PCIe interrupt type is MSI type, it is determined that the target interrupt processing mechanism is an MSI interrupt processing mechanism; and if the PCIe interrupt type is MSIX type, it is determined that the target interrupt processing mechanism is an MSIX interrupt processing mechanism. It can be understood that the PCIe IP core of the FPGA can support three interrupt types, i.e. INTx, MSI and MSIX, a corresponding interrupt type is selected in the PCIe IP core according to requirements, and the PCIe IP core has a corresponding interface signal for each interrupt type, and therefore there is a corresponding interrupt processing mechanism for each of the three interrupt types. The interrupt processing mechanism corresponding to the INTx type is an INTx interrupt processing mechanism, the interrupt processing mechanism corresponding to the MSI type is an MSI interrupt processing mechanism, and the interrupt processing mechanism corresponding to the MSIX type is an MSIX interrupt processing mechanism. As shown in FIGS. 2 and 3, disclosed in the embodiments of the present disclosure are schematic diagrams of existing interrupt processing mechanisms. In the prior art, the logic design for the PCIe interrupt type of the FPGA is performed by selecting one of the interrupt types from the INTx interrupt, the MSI interrupt or the MSIX interrupt according to software drive requirements, and therefore there is only one interrupt processing mechanism corresponding to the selected interrupt type to process an interrupt signal. When the PCIe interrupt type of the software drive changes, the interrupt processing mode of the FPGA also needs to be changed at the same time, which does not facilitate the construction of FPGA logic platform. However, the present disclosure allows for compatibility with three PCIe interrupt types.

Step S13: the internal interrupt signal is processed by means of the target interrupt processing mechanism, and a processing result is input to the PCIe IP core, such that the PCIe IP core sends an interrupt message packet to a central processing unit on the basis of the processing result.

In this embodiment, after the target interrupt processing mechanism is determined, the internal interrupt signal is processed by means of the target interrupt processing mechanism, and then the processing result is input to the PCIe IP core, such that the PCIe IP core sends an interrupt message packet to the central processing unit on the basis of the processing result.

Hence, in the present disclosure, a currently generated internal interrupt signal is acquired; a PCIe interrupt type supported by a current FPGA is determined according to an interrupt vector signal output by a PCIe IP core, so as to determine a corresponding target interrupt processing mechanism according to the PCIe interrupt type; and the internal interrupt signal is processed by means of the target interrupt processing mechanism, and a processing result is input to the PCIe IP core, such that the PCIe IP core sends an interrupt message packet to a central processing unit on the basis of the processing result. It can be seen that an FPGA cloud platform in the present disclosure supports a plurality of PCIe interrupt types, and each PCIe interrupt type has its corresponding interrupt processing mechanism; it only needs to determine which PCIe interrupt type is supported by the current FPGA according to an interrupt vector signal output by a PCIe IP core, and then an internal interrupt signal is processed by means of a corresponding target interrupt processing mechanism; and finally, a processing result is input to the PCIe IP core, such that the PCIe IP core sends an interrupt message packet to a central processing unit on the basis of the processing result. By means of the described technical solution, when the model of an FPGA is upgraded, only an interrupt processing mechanism needs to be switched, without modifying a logic code for internal interrupt processing. In addition, each interrupt function in the present disclosure can be independently developed and maintained, thereby enhancing the stability of an FPGA platform, expanding the compatibility of an FPGA with processor interrupts, facilitating the implementation of FPGA logic platform construction, and also ensuring the platform construction of an underlying driver layer.

Figure 4:
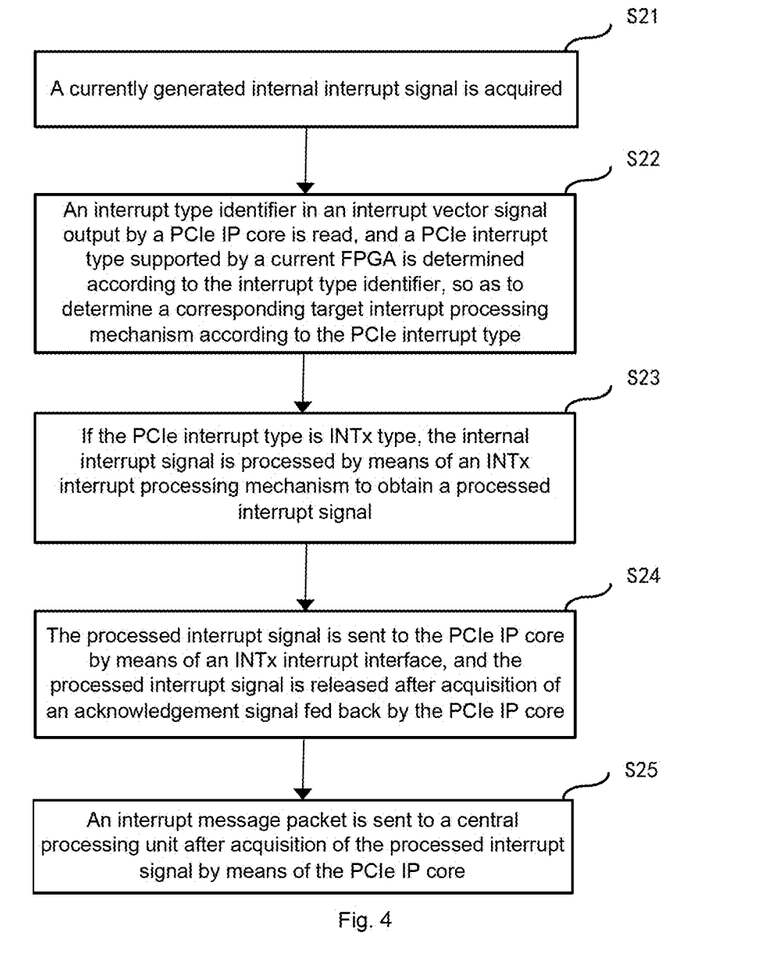
FIG. 4 is a flowchart of a PCIe interrupt processing method according to the present disclosure.
Figure 5:
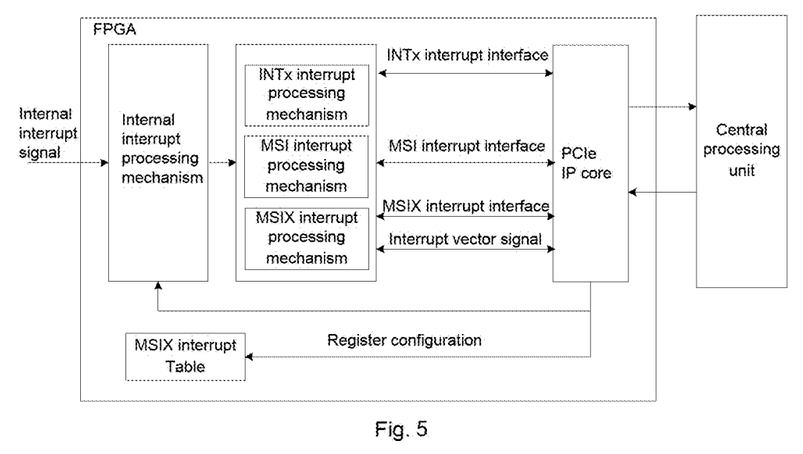
FIG. 5 is a schematic diagram of a PCIe interrupt processing mechanism according to the present disclosure.

As shown in FIGS. 4 and 5, disclosed in the embodiments of the present disclosure is a PCIe interrupt processing method. Compared with the foregoing embodiment, this embodiment describes and optimizes the technical solution. The method includes:

step S21: a currently generated internal interrupt signal is acquired.

Step S22: an interrupt type identifier in an interrupt vector signal output by a PCIe IP core is read, and a PCIe interrupt type supported by a current FPGA is determined according to the interrupt type identifier, so as to determine a corresponding target interrupt processing mechanism according to the PCIe interrupt type.

In this embodiment, which interrupt type is generated by the current FPGA PCIe can be determined according to the interrupt type identifier in the interrupt vector signal. It can be understood that the PCIe IP core of the FPGA outputs an interrupt vector signal irq_vector [97:0], where irq_vector [97:96] represents an identifier of a PCIe interrupt type supported by the current FPGA, 2'b00 represents INTx interrupt type, 2'b01 represents MSI interrupt type, and 2'b10 represents MSIX interrupt type.

Step S23: if the PCIe interrupt type is INTx type, the internal interrupt signal is processed by means of an INTx interrupt processing mechanism to obtain a processed interrupt signal.

In this embodiment, if the PCIe interrupt type is INTx type, the internal interrupt signal is processed by means of an INTx interrupt processing mechanism to obtain a processed interrupt signal.

Step S24: the processed interrupt signal is sent to the PCIe IP core by means of an INTx interrupt interface, and the processed interrupt signal is released after acquisition of an acknowledgement signal fed back by the PCIe IP core.

Figure 6:
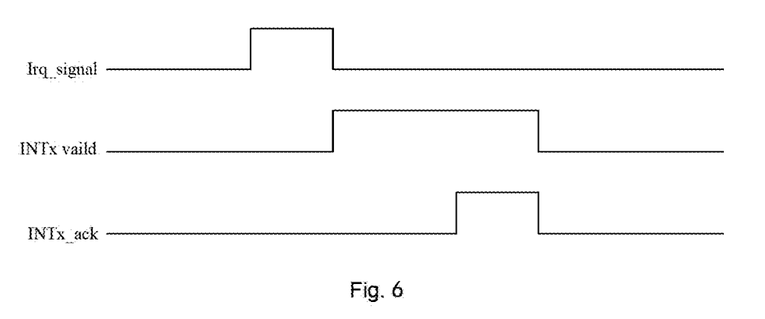
FIG. 6 is a schematic diagram of timing processing of an INTx interrupt interface according to the present disclosure.

In this embodiment, the processed interrupt signal is sent to the PCIe IP core by means of the INTx interrupt interface, and at the same time, an acknowledgement (ack) signal fed back from the PCIe IP core is waited for, and the processed interrupt signal is released after acquisition of the acknowledgement signal fed back by the PCIe IP core. FIG. 6 shows a diagram of timing processing.

Step S25: an interrupt message packet is sent to a central processing unit after acquisition of the processed interrupt signal by means of the PCIe IP core.

In this embodiment, after acquisition of the processed interrupt signal, the PCIe IP core sends an interrupt message packet to the central processing unit.

In another embodiment, the step that the internal interrupt signal is processed by means of the target interrupt processing mechanism, and a processing result is input to the PCIe IP core, such that the PCIe IP core sends an interrupt message packet to a central processing unit on the basis of the processing result may further include: if the PCIe interrupt type is MSI type, timing processing is performed on an MSI interrupt interface by means of an MSI interrupt processing mechanism on the basis of the internal interrupt signal to output a preset message address and an interrupt vector number corresponding to the internal interrupt signal to the PCIe IP core; and an interrupt message packet is sent to a central processing unit by means of the PCIe IP core on the basis of the preset message address and the interrupt vector number corresponding to the internal interrupt signal. Furthermore, during the described process, the method further includes: the preset message address pre-written in a capability register of the PCIe IP core is determined, and the interrupt vector signal is set on the basis of the preset message address; and the preset message address is acquired from the interrupt vector signal.

Figure 7:
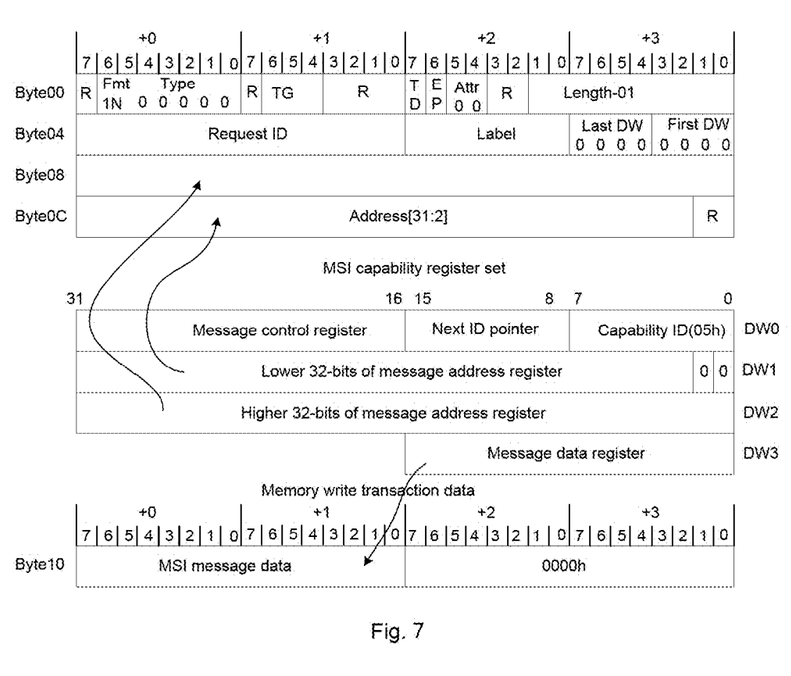
FIG. 7 is a schematic diagram of a request packet of an MSI interrupt according to the present disclosure.
Figure 8:
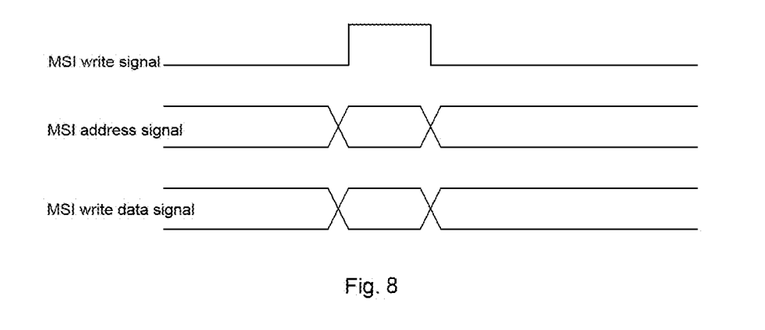
FIG. 8 is a schematic diagram of timing processing of an MSI interrupt interface according to the present disclosure.

That is, if the PCIe interrupt type is MSI type, the internal interrupt signal is processed by means of an MSI interrupt processing mechanism. It should be noted that the MSI interrupt mechanism uses a memory write request Transaction Layer Packet (TLP) packet to submit a request to a processor, and according to the packet format shown in FIG. 7, when an FPGA sends an interrupt message to a CPU, a message address and data information are required. The message address is written into a capability register of the FPGA PCIe IP when the host is initialized. The message address can be acquired from the interrupt vector signal irq_vector. As the PCIe interrupt supported by the current FPGA is MSI interrupt, the interrupt vector signal irq_vector [0:63] represents a destination address of an MSI memory write transaction, that is, the described preset message address. When the internal interrupt signal is obtained, timing processing needs to be performed on an MSI interrupt interface to output a preset message address and an interrupt vector number corresponding to the internal interrupt signal to the PCIe IP core, such that the PCIe IP core sends an interrupt message packet to the central processing unit on the basis of the preset message address and the interrupt vector number corresponding to the internal interrupt signal. FIG. 8 shows a diagram of timing processing. In the case that the MSI write signal is valid, an MSI address signal and an MSI write data signal are output, and the MSI address signal is output as irq_vector [0:63], that is, a preset message address; the MSI write data signal is output as a corresponding interrupt vector number, and then the PCIe IP core may send an interrupt message packet to the host CPU.

In another embodiment, the step that the internal interrupt signal is processed by means of the target interrupt processing mechanism, and a processing result is input to the PCIe IP core, such that the PCIe IP core sends an interrupt message packet to a central processing unit on the basis of the processing result includes: if the PCIe interrupt type is MSIX type, timing processing is performed on an MSIX interrupt interface by means of an MSIX interrupt processing mechanism on the basis of the internal interrupt signal to output address information and interrupt number information that are read from a target storage table; and an interrupt message packet is sent to a central processing unit by means of the PCIe IP core on the basis of the address information and the interrupt number information. Furthermore, during the described process, the method further includes: a corresponding target storage table is searched for on the basis of the interrupt vector number corresponding to the internal interrupt signal, and the address information and the interrupt number information are read from the target storage table.

Figure 9:
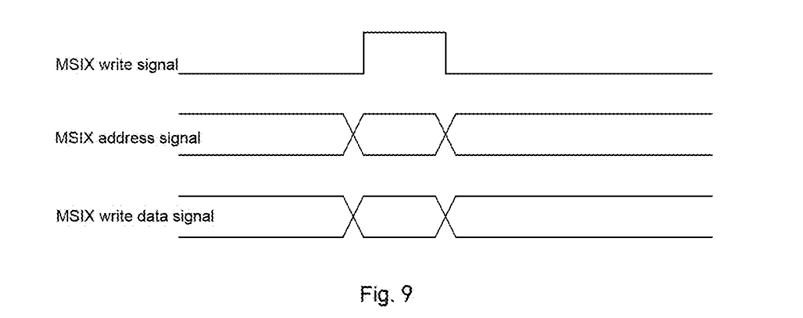
FIG. 9 is a schematic diagram of timing processing of an MSIX interrupt interface according to the present disclosure.

That is, if the PCIe interrupt type is MSIX type, the internal interrupt signal is processed by means of an MSIX interrupt processing mechanism. It should be noted that the MSIX interrupt mechanism also uses a memory write request Transaction Layer Packet (TLP) to submit a request to a processor. However, for MSI interrupts, consecutive interrupt numbers must be allocated to the FPGA PCIE in a host interrupt controller, it is very difficult for the CPU interrupt controller to ensure that these interrupt vector numbers are consecutive, and therefore the interrupt controller cannot allocate sufficient interrupt requests to the FPGA device. Instead, requests with nonconsecutive interrupt numbers can be supported in MSIX interrupts. Each interrupt request uses an independent message address field and message data field, such that the MSIX capability register uses an array to store the message address field and the message data field instead of placing the two fields into the capability register. The array is referred to as an MSIX Table, that is, an MSIX interrupt table module has a table therein storing the message address field and the message data field, and a write operation is performed on the table when the host CPU initializes the FPGA PCIe. As the PCIe interrupt supported by the current FPGA is MSIX interrupt, when an internal interrupt signal is received, firstly, a table in the MSIX interrupt table module is searched for by taking the interrupt vector number corresponding to the internal interrupt signal as an address, and a corresponding message address field and message data field required for sending an interrupt message packet are read, wherein the message address field represents address information, and the message data field represents interrupt number information. Thereafter, timing processing is performed on the MSIX interrupt interface of the PCIe IP core to output the address information and the interrupt number information that are read, such that the PCIe IP core sends an interrupt message packet to the central processing unit on the basis of the address information and the interrupt number information. FIG. 9 shows a diagram of timing processing. In the case that an MSIX write signal is valid, an MSIX address signal and an MSIX write data signal are output, the MSIX address signal is output as the address information read from the MSIX interrupt table module, and the MSIX write data signal is output as the interrupt number information read from the MSIX interrupt table module, such that the PCIe IP core can send an interrupt message packet to the host CPU.

For the processing procedure of the foregoing step S21, reference may be made to the corresponding content disclosed in the foregoing embodiment, and details are not described herein again.

It can be seen that in the present disclosure, which interrupt type is generated by the current FPGA PCIe can be determined according to an interrupt type identifier in an interrupt vector signal, so as to determine an interrupt processing mechanism corresponding to the interrupt type, and then an internal interrupt signal is processed by means of a target interrupt processing mechanism, and corresponding processing modes are provided for different interrupt types and interrupt processing mechanisms. The interrupt processing mechanism functions can be independently developed and maintained without affecting each other, thereby not only expanding the compatibility of an FPGA with processor interrupts, but also facilitating the implementation of FPGA logic platform construction.

Figure 10:
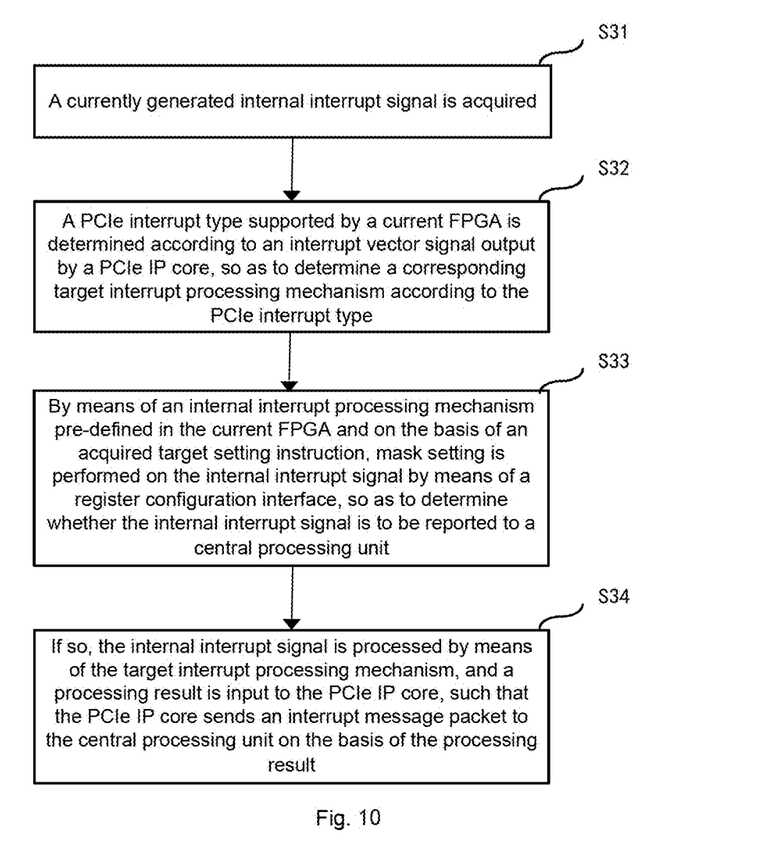
FIG. 10 is a flowchart of a PCIe interrupt processing method according to the present disclosure.

As shown in FIG. 10, disclosed in the embodiments of the present disclosure is a PCIe interrupt processing method. Compared with the foregoing embodiment, this embodiment further describes and optimizes the technical solution. The method includes:

step S31: a currently generated internal interrupt signal is acquired.

Step S32: a PCIe interrupt type supported by a current FPGA is determined according to an interrupt vector signal output by a PCIe IP core, so as to determine a corresponding target interrupt processing mechanism according to the PCIe interrupt type.

Step S33: by means of an internal interrupt processing mechanism pre-defined in the current FPGA and on the basis of an acquired target setting instruction, mask setting is performed on the internal interrupt signal by means of a register configuration interface, so as to determine whether the internal interrupt signal is to be reported to a central processing unit.

In this embodiment, an internal interrupt processing mechanism is also defined in advance in the FPGA, mask setting can be performed on the internal interrupt signal by means of a register configuration interface according to the internal interrupt processing mechanism, so as to determine whether the internal interrupt signal is to be reported to the central processing unit, and which internal interrupt signal needs to be reported to the central processing unit is determined according to a target setting instruction input by an operator. That is, in the internal interrupt processing mechanism, mask setting is performed on some internal interrupt signals therein by means of the register configuration interface of the PCIe to be reported to the host CPU, while others do not need to be reported to the host CPU, that is, are filtered out, and then only the internal interrupt signals to be reported to the central processing unit are output to the backend interrupt processing mechanisms for processing.

It should be noted that the described process further includes: the internal interrupt signal is numbered by means of the internal interrupt processing mechanism on the basis of a preset number, so as to obtain an interrupt vector number corresponding to each internal interrupt signal. That is, the internal interrupt processing mechanism also allows for parameter setting of the number of internal interrupt signals in the FPGA logic, for example, the number of interrupt vectors may be set to 1-32, and then these internal interrupt signals are numbered starting from the number 0.

Step S34: upon determination that the internal interrupt signal is to be reported to the central processing unit, the internal interrupt signal is processed by means of the target interrupt processing mechanism, and a processing result is input to the PCIe IP core, such that the PCIe IP core sends an interrupt message packet to the central processing unit on the basis of the processing result.

In this embodiment, during processing the internal interrupt signal by means of the target interrupt processing mechanism, the method further includes: if a plurality of internal interrupt signals are acquired, the internal interrupt signals are processed in sequence in an ascending order of the interrupt vector numbers. It can be understood that, when internal interrupt signals are processed by means of the target interrupt processing mechanism, if a plurality of interrupt signals are input at the same time, the internal interrupt signals are processed in sequence in an ascending order of the interrupt vector numbers, that is, the priority of the interrupt vector number 0 is the highest and the priority of the interrupt vector number N is the lowest by default, the internal interrupt signal with the interrupt vector number 0 is preferentially processed, while other internal interrupt signals need to wait to be processed in sequence.

For the processing procedure of the foregoing steps S31 and S32, reference may be made to the corresponding content disclosed in the foregoing embodiment, and details are not described herein again.

It can be seen that, in the embodiments of the present disclosure, after an internal interrupt signal is generated, the internal interrupt signal is firstly processed by means of an internal interrupt signal processing mechanism, so as to determine which internal interrupt signal needs to be reported to a central processing unit; in addition, the internal interrupt signal may also be numbered by means of the internal interrupt processing mechanism, so as to obtain an interrupt vector number corresponding to each internal interrupt signal; and subsequently, when the internal interrupt signal is processed by means of a target interrupt processing mechanism, if a plurality of internal interrupt signals are acquired, the internal interrupt signals are processed in sequence in an ascending order of the interrupt vector numbers.

Figure 11:
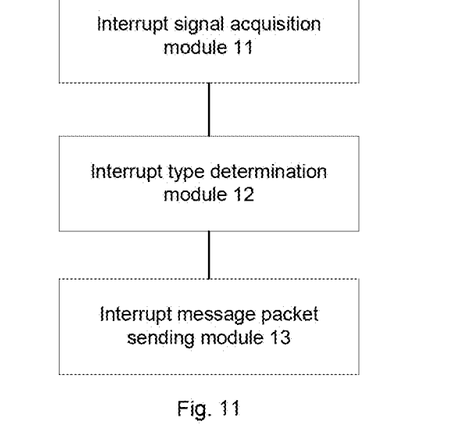
FIG. 11 is a schematic structural diagram of a PCIe interrupt processing apparatus according to the present disclosure.

As shown in FIG. 11, disclosed in the embodiments of the present disclosure is a PCIe interrupt processing apparatus. The apparatus includes:

an interrupt signal acquisition module 11, configured to acquire a currently generated internal interrupt signal;

an interrupt type determination module 12, configured to determine, a PCIe interrupt type supported by a current FPGA according to an interrupt vector signal output by a PCIe IP core, so as to determine a corresponding target interrupt processing mechanism according to the PCIe interrupt type; and an interrupt message packet sending module 13, configured to process the internal interrupt signal by means of the target interrupt processing mechanism, and input a processing result to the PCIe IP core, such that the PCIe IP core sends an interrupt message packet to a central processing unit on the basis of the processing result.

Hence, in the present disclosure, a currently generated internal interrupt signal is acquired; a PCIe interrupt type supported by a current FPGA is determined according to an interrupt vector signal output by a PCIe IP core, so as to determine a corresponding target interrupt processing mechanism according to the PCIe interrupt type; and the internal interrupt signal is processed by means of the target interrupt processing mechanism, and a processing result is input to the PCIe IP core, such that the PCIe IP core sends an interrupt message packet to a central processing unit on the basis of the processing result. It can be seen that an FPGA cloud platform in the present disclosure supports a plurality of PCIe interrupt types, and each PCIe interrupt type has its corresponding interrupt processing mechanism; it only needs to determine which PCIe interrupt type is supported by the current FPGA according to an interrupt vector signal output by a PCIe IP core, and then an internal interrupt signal is processed by means of a corresponding target interrupt processing mechanism; and finally, a processing result is input to the PCIe IP core, such that the PCIe IP core sends an interrupt message packet to a central processing unit on the basis of the processing result. By means of the described technical solution, when the model of an FPGA is upgraded, only an interrupt processing mechanism needs to be switched, without modifying a logic code for internal interrupt processing. In addition, each interrupt function in the present disclosure can be independently developed and maintained, thereby enhancing the stability of an FPGA platform, expanding the compatibility of an FPGA with processor interrupts, facilitating the implementation of FPGA logic platform construction, and also ensuring the platform construction of an underlying driver layer.

In some embodiments, the interrupt signal acquisition module 11 may include:
a signal acquisition unit, configured to acquire an internal interrupt signal currently generated in a kernel.

In some embodiments, the interrupt type determination module 12 may include:
an identifier reading unit, configured to read an interrupt type identifier in the interrupt vector signal output by the PCIe IP core, and determine a PCIe interrupt type supported by the current FPGA according to the interrupt type identifier.

In some embodiments, the interrupt type determination module 12 may include:
an INTx type determination unit, configured to, if the PCIe interrupt type is INTx type, determine that the target interrupt processing mechanism is an INTx interrupt processing mechanism;
an MSI type determination unit, configured to, if the PCIe interrupt type is MSI type, determine that the target interrupt processing mechanism is an MSI interrupt processing mechanism; and an MSIX type determination unit, configured to, if the PCIe interrupt type is MSIX type, determine that the target interrupt processing mechanism is an MSIX interrupt processing mechanism.

In some embodiments, the interrupt message packet sending module 13 may include:
an INTx interrupt processing unit, configured to, if the PCIe interrupt type is INTx type, process the internal interrupt signal by means of an INTx interrupt processing mechanism to obtain a processed interrupt signal;
a signal releasing unit, configured to send the processed interrupt signal to the PCIe IP core by means of an INTx interrupt interface, and release the processed interrupt signal after acquisition of an acknowledgement signal fed back by the PCIe IP core; and
a first message packet sending unit, configured to send an interrupt message packet to a central processing unit after acquisition of the processed interrupt signal by means of the PCIe IP core.

In some embodiments, the interrupt message packet sending module 13 may include:
an MSI interrupt processing unit, configured to, if the PCIe interrupt type is MSI type, perform timing processing on an MSI interrupt interface by means of an MSI interrupt processing mechanism on the basis of the internal interrupt signal to output a preset message address and an interrupt vector number corresponding to the internal interrupt signal to the PCIe IP core; and
a second message packet sending unit, configured to send an interrupt message packet to a central processing unit by means of the PCIe IP core on the basis of the preset message address and the interrupt vector number corresponding to the internal interrupt signal.

In some embodiments, the PCIe interrupt processing apparatus may further include:
a message address determination unit, configured to determine the preset message address pre-written in a capability register of the PCIe IP core, and set the interrupt vector signal on the basis of the preset message address; and
a message address acquisition unit, configured to acquire the preset message address from the interrupt vector signal.

In some embodiments, the interrupt message packet sending module 13 may include:
an MSIX interrupt processing unit, configured to, if the PCIe interrupt type is MSIX type, perform timing processing on an MSIX interrupt interface by means of an MSIX interrupt processing mechanism on the basis of the internal interrupt signal to output address information and interrupt number information that are read from a target storage table; and
a third message packet sending unit, configured to send an interrupt message packet to a central processing unit by means of the PCIe IP core on the basis of the address information and the interrupt number information.

In some embodiments, the PCIe interrupt processing apparatus may further include:
an information reading unit, configured to search for a corresponding target storage table on the basis of the interrupt vector number corresponding to the internal interrupt signal, and read the address information and the interrupt number information from the target storage table.

In some embodiments, following the interrupt signal acquisition module 11, the apparatus may further include:
a mask setting unit, which is configured to, by means of an internal interrupt processing mechanism pre-defined in the current FPGA and on the basis of an acquired target setting instruction, perform mask setting on the internal interrupt signal by means of a register configuration interface, so as to determine whether the internal interrupt signal is to be reported to a central processing unit; and
a step jumping unit, configured to, upon determination that the internal interrupt signal is to be reported to the central processing unit, jump to the step of processing the internal interrupt signal by means of the target interrupt processing mechanism.

In some embodiments, the PCIe interrupt processing apparatus may further include:
an interrupt vector number acquisition unit, configured to number the internal interrupt signal by means of the internal interrupt processing mechanism on the basis of a preset number, so as to obtain an interrupt vector number corresponding to each internal interrupt signal.

In some embodiments, during the process of the interrupt message packet sending module, the apparatus may further include:

a multi-signal processing unit. configured to, if a plurality of internal interrupt signals are acquired, process the internal interrupt signals in sequence in an ascending order of the interrupt vector numbers.

Figure 12:
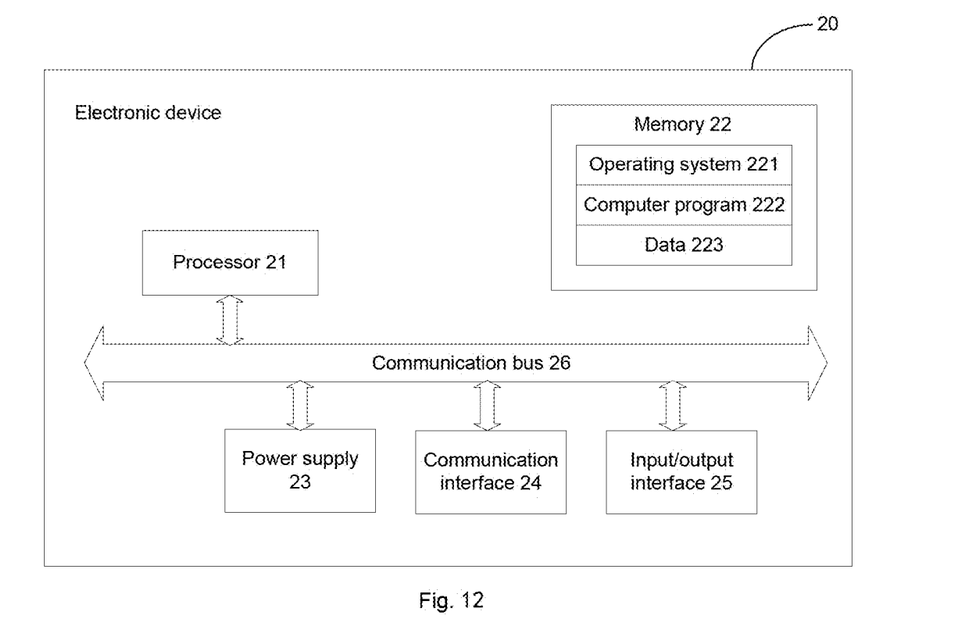
FIG. 12 is a structural diagram of an electronic device according to the present disclosure.

FIG. 12 is a schematic structural diagram of an electronic device according to an embodiment of the present disclosure. The electronic device may include: at least one processor 21, at least one memory 22, a power supply 23, a communication interface 24, an input/output interface 25, and a communication bus 26. The memory 22 is configured to store a computer program, and the computer program is loaded and executed by the processor 21, so as to implement relevant steps in the PCIe interrupt processing method executed by the electronic device as disclosed in any of the foregoing embodiments.

In this embodiment, the power supply 23 is configured to provide an operating voltage for each hardware device on the electronic device 20. The communication interface 24 can establish a data transmission channel between the electronic device 20 and an external device, and a communication protocol followed thereby is any communication protocol that can be applied to the technical solution of the present disclosure, which is not specifically limited herein. The input/output interface 25 is configured to acquire external input data or to output data externally, and an interface type thereof can be selected according to application requirements, which is not limited herein.

The processor 21 may include one or more processing cores, such as 4-core processor and 8-core processor. The processor 21 may be implemented in at least one hardware form of Digital Signal Processing (DSP), Field-Programmable Gate Array (FPGA), and Programmable Logic Array (PLA). The processor 21 may also include a main processor and a coprocessor. The main processor is a processor configured to process data in a wake-up state, and is also referred to as a Central Processing Unit (CPU); and the coprocessor is a low power consumption processor configured to process data in a standby state. In some embodiments, the processor 21 may be integrated with a Graphics Processing Unit (GPU), and the GPU is configured to be responsible for rendering and drawing of content required to be displayed on a display screen. In some embodiments, the processor 21 may further include an Artificial Intelligence (AI) processor, and the AI processor is configured to process computing operations related to machine learning.

In addition, the memory 22, as a carrier for resource storage, may be a read-only memory, a random access memory, a magnetic disk or an optical disk, etc., resources stored thereon include an operating system 221, a computer program 222, data 223, etc., and the storage manner may be temporary storage or permanent storage.

The operating system 221 is configured to manage and control various hardware devices on the electronic device 20 and the computer program 222, so as to implement computation and processing of massive data 223 in the memory 22 by the processor 21. The operating system 221 may be Windows, Unix, Linux, etc. The computer program 222 may further include a computer program that can be used to accomplish other specific tasks in addition to the computer program that can be used to accomplish the PCIe interrupt processing method executed by the electronic device 20 as disclosed in any of the foregoing embodiments. The data 223 may include data received by the electronic device and transmitted from an external device, and may also include data collected by the input/output interface 25 of the electronic device, etc.

Further, disclosed in the embodiments of the present disclosure is a computer non-transitory readable storage medium, wherein the storage medium stores a computer program, when loaded and executed by a processor, implements the method steps executed during the PCIe interrupt processing process as disclosed in any one of the foregoing embodiments.

The embodiments in this description are described in a progressive manner. Each embodiment focuses on a part different from other embodiments. For the same or similar parts among the embodiments, reference may be made to each other. As the apparatus disclosed in the embodiments corresponds to the method disclosed in the embodiments, the description of the apparatus is relatively simple, and for the related parts, reference can be made to the description of the method.

A person skilled in the art may further appreciate that, units and algorithm steps in the examples described in conjunction with the embodiments disclosed herein may be implemented by electronic hardware, computer software, or a combination of the two. To clearly describe the interchangeability between the hardware and the software, the foregoing has generally described compositions and steps of each example according to functions. Whether the functions are executed by hardware or software depends on specific applications and design constraint conditions of the technical solutions. A person skilled in the art may use different methods to implement the described functions for each specific application, but such implementation shall not be considered as going beyond the scope of the present disclosure.

The steps of a method or algorithm described in conjunction with the embodiments disclosed herein may be embodied directly in hardware, in a software module executed by a processor, or in a combination of the two. The software module may be placed in a Random Access Memory (RAM), a memory, a Read-Only Memory (ROM), an electrically programmable ROM, an electrically erasable programmable ROM, a register, a hard disk, a removable magnetic disk, a CD-ROM, or any other form of storage medium known in the art.

Finally, it should be noted that, in this description, relationship terms such as first and second are merely used to distinguish one entity or operation from another entity or operation, and do not necessarily require or imply any actual relationship or sequence between these entities or operations. Furthermore, the terms "include" and "contain", or any other variant thereof are intended to cover a non-exclusive inclusion, such that a process, a method, an article, or a device that includes a series of elements not only includes those elements, but also includes other elements that are not explicitly listed, or further includes elements inherent to the process, the method, the article, or the device. Without more limitations, an element limited by "include a . . . " does not exclude other same elements also existing in a process, a method, an article, or a device that includes the element.

The foregoing describes in detail a PCIe interrupt processing method and apparatus, a device and a storage non-transitory readable storage medium provided in the present disclosure. Examples are used therein to describe principles and implementations of the present disclosure. The description of the described embodiments is merely used to help understand the method and core idea of the present disclosure. Meanwhile, a person of ordinary skill in the art may make modifications to the implementations and application scopes according to the idea of the present disclosure. In conclusion, the content of the description shall not be construed as a limitation to the present disclosure.

What is claimed is:

1. A method for processing PCIe interrupt, comprising:
acquiring a currently generated internal interrupt signal;
determining a PCIe interrupt type supported by a current FPGA according to an interrupt vector signal output by a PCIe IP core, so as to determine a corresponding target interrupt processing mechanism according to the PCIe interrupt type; and
processing the internal interrupt signal by means of the target interrupt processing mechanism, and inputting a processing result to the PCIe IP core, such that the PCIe IP core sends an interrupt message packet to a central processing unit on the basis of the processing result, comprise: when the PCIe interrupt type is INTx type, processing the internal interrupt signal by means of an INTx interrupt processing mechanism to obtain a processed interrupt signal; sending the processed interrupt signal to the PCIe IP core by means of an INTx interrupt interface, and releasing the processed interrupt signal after acquisition of an acknowledgement signal fed back by the PCIe IP core; and sending an interrupt message packet to a central processing unit after acquisition of the processed interrupt signal by means of the PCIe IP core.

2. The method for processing PCIe interrupt according to claim 1, wherein acquiring a currently generated internal interrupt signal comprises:
acquiring an internal interrupt signal currently generated in a kernel.

3. The method for processing PCIe interrupt according to claim 1, wherein determining a PCIe interrupt type supported by a current FPGA according to an interrupt vector signal output by a PCIe IP core comprises:
reading an interrupt type identifier in the interrupt vector signal output by the PCIe IP core, and determining a PCIe interrupt type supported by the current FPGA according to the interrupt type identifier.

4. The method for processing PCIe interrupt according to claim 3, wherein reading an interrupt type identifier in the interrupt vector signal output by the PCIe IP core comprises:
reading an identifier of a PCIe interrupt type supported by the current FPGA in the interrupt vector signal irq_vector[97:0] output by the PCIe IP core of the FPGA as the interrupt type identifier of the PCIe interrupt type supported by the current FPGA.

5. The method for processing PCIe interrupt according to claim 4, wherein determining a PCIe interrupt type supported by the current FPGA according to the interrupt type identifier comprises:
in the case that the interrupt type identifier is 2'b00, determining that the PCIe interrupt type supported by the current FPGA is INTx interrupt type;
in the case that the interrupt type identifier is 2'b01, determining that the PCIe interrupt type supported by the current FPGA is Message Signal Interrupt (MSI) interrupt type; and
in the case that the interrupt type identifier is 2'b10, determining that the PCIe interrupt type supported by the current FPGA is MSIX interrupt type.

6. The method for processing PCIe interrupt according to claim 1, wherein determining a corresponding target interrupt processing mechanism according to the PCIe interrupt type comprises:
when the PCIe interrupt type is INTx type, determining that the target interrupt processing mechanism is an INTx interrupt processing mechanism;
when the PCIe interrupt type is MSI type, determining that the target interrupt processing mechanism is an MSI interrupt processing mechanism; and
when the PCIe interrupt type is MSIX type, determining that the target interrupt processing mechanism is an MSIX interrupt processing mechanism.

7. The method for processing PCIe interrupt according to claim 1, wherein processing the internal interrupt signal by means of the target interrupt processing mechanism, and inputting a processing result to the PCIe IP core, such that the PCIe IP core sends an interrupt message packet to a central processing unit on the basis of the processing result comprise:
when the PCIe interrupt type is MSI type, performing timing processing on an MSI interrupt interface by means of an MSI interrupt processing mechanism on the basis of the internal interrupt signal to output a preset message address and an interrupt vector number corresponding to the internal interrupt signal to the PCIe IP core; and
sending an interrupt message packet to a central processing unit by means of the PCIe IP core on the basis of the preset message address and the interrupt vector number corresponding to the internal interrupt signal.

8. The method for processing PCIe interrupt according to claim 7, further comprising:
determining the preset message address pre-written in a capability register of the PCIe IP core, and setting the interrupt vector signal on the basis of the preset message address; and
acquiring the preset message address from the interrupt vector signal.

9. The method for processing PCIe interrupt according to claim 8, wherein acquiring the preset message address from the interrupt vector signal comprises:
acquiring a destination address of an MSI memory write transaction from the interrupt vector signal as the preset message address.

10. The method for processing PCIe interrupt according to claim 1, wherein processing the internal interrupt signal by means of the target interrupt processing mechanism, and inputting a processing result to the PCIe IP core, such that the PCIe IP core sends an interrupt message packet to a central processing unit on the basis of the processing result comprise:
when the PCIe interrupt type is MSIX type, performing timing processing on an MSIX interrupt interface by means of an MSIX interrupt processing mechanism on the basis of the internal interrupt signal to output address information and interrupt number information that are read from a target storage table; and
sending an interrupt message packet to a central processing unit by means of the PCIe IP core on the basis of the address information and the interrupt number information.

11. The method for processing PCIe interrupt according to claim 10, wherein before performing timing processing on an MSIX interrupt interface by means of an MSIX interrupt processing mechanism on the basis of the internal interrupt signal to output address information and interrupt number information that are read from a target storage table, the method further comprises:
storing each interrupt request in an MSIX interrupt table module by using an independent message address field and message data field, so as to obtain the target storage table, wherein the message address field represents the address information, and the message data field represents the interrupt number information.

12. The method for processing PCIe interrupt according to claim 11, further comprising:
searching for a corresponding target storage table on the basis of the interrupt vector number corresponding to the internal interrupt signal, and reading the address information and the interrupt number information from the target storage table.

13. The method for processing PCIe interrupt according to claim 12, wherein searching for a corresponding target storage table on the basis of the interrupt vector number corresponding to the internal interrupt signal, and reading the address information and the interrupt number information from the target storage table comprise:
when the internal interrupt signal is received, searching for the target storage table in the MSIX interrupt table module by taking the interrupt vector number corresponding to the internal interrupt signal as an address; and
reading a message address field from the target storage table as the address information, and reading a message data field from the target storage table as the interrupt number information.

14. The method for processing PCIe interrupt according to claim 1, wherein after acquiring a currently generated internal interrupt signal, the method further comprises:
by means of an internal interrupt processing mechanism pre-defined in the current FPGA and on the basis of an acquired target setting instruction, performing mask setting on the internal interrupt signal by means of a register configuration interface, so as to determine whether the internal interrupt signal is to be reported to a central processing unit; and
upon determination that the internal interrupt signal is to be reported to the central processing unit, jumping to the step of processing the internal interrupt signal by means of the target interrupt processing mechanism.

15. The method for processing PCIe interrupt according to claim 14, further comprising:
numbering the internal interrupt signal by means of the internal interrupt processing mechanism on the basis of a preset number, so as to obtain an interrupt vector number corresponding to each internal interrupt signal.

16. The method for processing PCIe interrupt according to claim 15, wherein during processing the internal interrupt signal by means of the target interrupt processing mechanism, the method further comprises:
when a plurality of internal interrupt signals are acquired, processing the internal interrupt signals in sequence in an ascending order of the interrupt vector numbers.

17. An electronic device, comprising:
a memory, configured to store a computer program; and
a processor, configured to execute the computer program to:
acquire a currently generated internal interrupt signal;
determine a PCIe interrupt type supported by a current FPGA according to an interrupt vector signal output by a PCIe IP core, so as to determine a corresponding target interrupt processing mechanism according to the PCIe interrupt type; and
process the internal interrupt signal by means of the target interrupt processing mechanism, and input a processing result to the PCIe IP core, such that the PCIe IP core sends an interrupt message packet to a central processing unit on the basis of the processing result, comprise:
when the PCIe interrupt type is INTx type, process the internal interrupt signal by means of an INTx interrupt processing mechanism to obtain a processed interrupt signal; send the processed interrupt signal to the PCIe IP core by means of an INTx interrupt interface, and release the processed interrupt signal after acquisition of an acknowledgement signal fed back by the PCIe IP core; and send an interrupt message packet to a central processing unit after acquisition of the processed interrupt signal by means of the PCIe IP core.

18. A computer non-transitory readable storage medium, configured to store a computer program; wherein the computer program, when executed by a processor, implements the steps:
acquire a currently generated internal interrupt signal;
determine a PCIe interrupt type supported by a current FPGA according to an interrupt vector signal output by a PCIe IP core, so as to determine a corresponding target interrupt processing mechanism according to the PCIe interrupt type; and
process the internal interrupt signal by means of the target interrupt processing mechanism, and input a processing result to the PCIe IP core, such that the PCIe IP core sends an interrupt message packet to a central processing unit on the basis of the processing result, comprise:
when the PCIe interrupt type is INTx type, process the internal interrupt signal by means of an INTx interrupt processing mechanism to obtain a processed interrupt signal; send the processed interrupt signal to the PCIe IP core by means of an INTx interrupt interface, and release the processed interrupt signal after acquisition of an acknowledgement signal fed back by the PCIe IP core; and send an interrupt message packet to a central processing unit after acquisition of the processed interrupt signal by means of the PCIe IP core.

19. The method for processing PCIe interrupt according to claim 9, the method further comprises:
in a case that the MSI write signal is valid, an MSI address signal and an MSI write data signal are output, and the MSI address signal is output as the preset message address, the MSI write data signal is output as a corresponding interrupt vector number.

* * * * *